US012335683B2

(12) United States Patent
Andersen

(10) Patent No.: US 12,335,683 B2
(45) **Date of Patent: *Jun. 17, 2025**

(54) COMPRESSION LOADED SLIT SHAPED WAVEGUIDE

(71) Applicant: ROKU, INC., San Jose, CA (US)

(72) Inventor: Kasper Andersen, Aarhus (DK)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/664,099

(22) Filed: May 19, 2022

(65) Prior Publication Data

US 2023/0379617 A1 Nov. 23, 2023

(51) Int. Cl.
*H04R 1/34* (2006.01)
*H04R 1/02* (2006.01)
*H04R 1/40* (2006.01)

(52) U.S. Cl.
CPC ............. *H04R 1/345* (2013.01); *H04R 1/028* (2013.01); *H04R 1/403* (2013.01); *H04R 2499/15* (2013.01)

(58) Field of Classification Search
CPC ........ H04R 1/345; H04R 1/028; H04R 1/403; H04R 2499/15
See application file for complete search history.

(56) References Cited

U.S. PATENT DOCUMENTS 5,524,062 A 6/1996 Oh
10,986,443 B2 * 4/2021 Kim ....................... H04R 1/345
2006/0204022 A1 9/2006 Hooley et al.
2009/0316938 A1 12/2009 Matsumoto
2010/0189267 A1 7/2010 Konagai et al.
2013/0121515 A1 5/2013 Hooley et al.
2020/0021909 A1 1/2020 Smithers et al.
2021/0176547 A1 * 6/2021 Wang .................... G06F 1/1688
2021/0200504 A1 7/2021 Park et al.
2021/0345037 A1 * 11/2021 Rhim ..................... H04R 9/025
2022/0182744 A1 6/2022 Han et al.
2022/0210548 A1 * 6/2022 Zheng ................... G06F 1/1688
(Continued)

FOREIGN PATENT DOCUMENTS

WO WO 2021/050250 A1 3/2021

OTHER PUBLICATIONS

U.S. Appl. No. 17/816,752, "Compression Loaded Slit Shaped Waveguide", to Kasper Andersen, filed Aug. 2, 2022. pp. 1-50.
(Continued)

*Primary Examiner* — Jason R Kurr
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for a sound source with slit shaped waveguide. An example embodiment of the sound source includes a driver configured to receive audio signal current and generate pressurized air and a chamber coupled to the driver and configured to direct the pressurized air from the driver. The sound source further includes a slit shaped exit coupled to the chamber and configured to receive the pressurized air from the chamber and to emit sound waves.

16 Claims, 8 Drawing Sheets

(56) References Cited

U.S. PATENT DOCUMENTS

| | | | | |
|---|---|---|---|---|
| 2022/0240007 | A1* | 7/2022 | Hagio .................... | G10K 11/20 |
| 2024/0314494 | A1* | 9/2024 | Jancovich .............. | H04R 1/345 |

OTHER PUBLICATIONS

Extended European Search Report for Application No. 23173357.7 mailed Oct. 12, 2023, 12 pages.

U.S. Appl. No. 19/056,935, filed Feb. 19, 2025, entitled "Compression Loaded Slit Shaped Waveguide".

* cited by examiner

Sound Source 430

COMPRESSION LOADED SLIT SHAPED WAVEGUIDE

BACKGROUND

Field

This disclosure is generally directed to speakers, and more particularly to forming compression loaded canal as a sound emitter.

Background

Content, such as a movie or a television (TV) show, is typically displayed on a television or other display screen for watching by users. Accordingly, a user's experience of the content is typically confined to the TV and to speakers connected to the TV.

As the technology for the TVs has evolved, frameless TVs or minimal bezel TVs have been manufactured. In order to keep these TVs as thin as possible, the speakers (e.g., the loudspeakers for these TVs) have moved to the back of the frameless TVs or the minimal bezel TVs. However, having the speakers on the back of the TVs compromises the sound clarity of the speakers. For example, having the speakers on the back of the TV can result in early reflections of the sound waves that can result in peaks and deeps in the sound waves that cannot completely be corrected. These early reflections, for example, can depend on the location of the TV in an area and/or the location of a user with respect to the TV.

SUMMARY

Provided herein are system, apparatus, article of manufacture, method and/or computer program product embodiments, and/or combinations and sub-combinations thereof, for a sound source with slit shaped waveguide.

An example embodiment of the sound source includes a driver configured to receive audio signal current and generate pressurized air and a chamber coupled to the driver and configured to direct the pressurized air from the driver. The sound source further includes a slit shaped exit coupled to the chamber and configured to receive the pressurized air from the chamber and to emit sound waves.

In some embodiments, the driver can be a compression driver. In some embodiments, the chamber is configured to direct the pressurized air to the slit shaped exit without generating the sound waves within the chamber.

In some embodiments, the sound source can further include a second slit shaped exit, where the slit shaped exit and the second slit shaped exit are arranged in an array. In some embodiments, the slit shaped exit has a length of about 12 mm and a height of about 1 mm.

In some embodiments, the sound source can further include a second driver configured to receive a second audio signal current and generate second pressurized air and a second chamber coupled to the second driver and configured to direct the second pressurized air from the second driver. In some examples, the sound source can include a second slit shaped exit coupled to the second chamber and configured to receive the second pressurized air from the chamber and to emit second sound waves. Additionally, or alternatively, the sound source can include an array of exits coupled to the second chamber and configured to receive the second pressurized air from the chamber and to emit second sound waves, where a surface area of the array of exits is designed to emit the second sound waves.

In some embodiments, a length of the chamber is designed to optimize one or more parameters of the sound waves. In some embodiments, the chamber includes a connector to couple to the driver and wherein the connector is designed to optimize one or more parameters of the sound waves.

An example embodiment of a display device includes a sound source and a controller. The sound source includes a driver configured to receive audio signal current and generate pressurized air and a chamber coupled to the driver and configured to direct the pressurized air from the driver. The sound source further includes a slit shaped exit coupled to the chamber and configured to receive the pressurized air from the chamber and to emit sound waves. The controller can be configured to control the driver.

Another example embodiment is a method including receiving, by a driver of a sound source, an audio signal current and generating, by the driver of the sound source, pressurized air. The method further includes directing, using a chamber coupled to the driver of the sound source, the pressurized air from the driver. The method also includes receiving, using a slit shaped exit coupled to the chamber, the pressurized air from the chamber and emitting, using the slit shaped exit and using the pressurized air, sound waves.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for a sound source with slit shaped waveguide.

Figure 1:
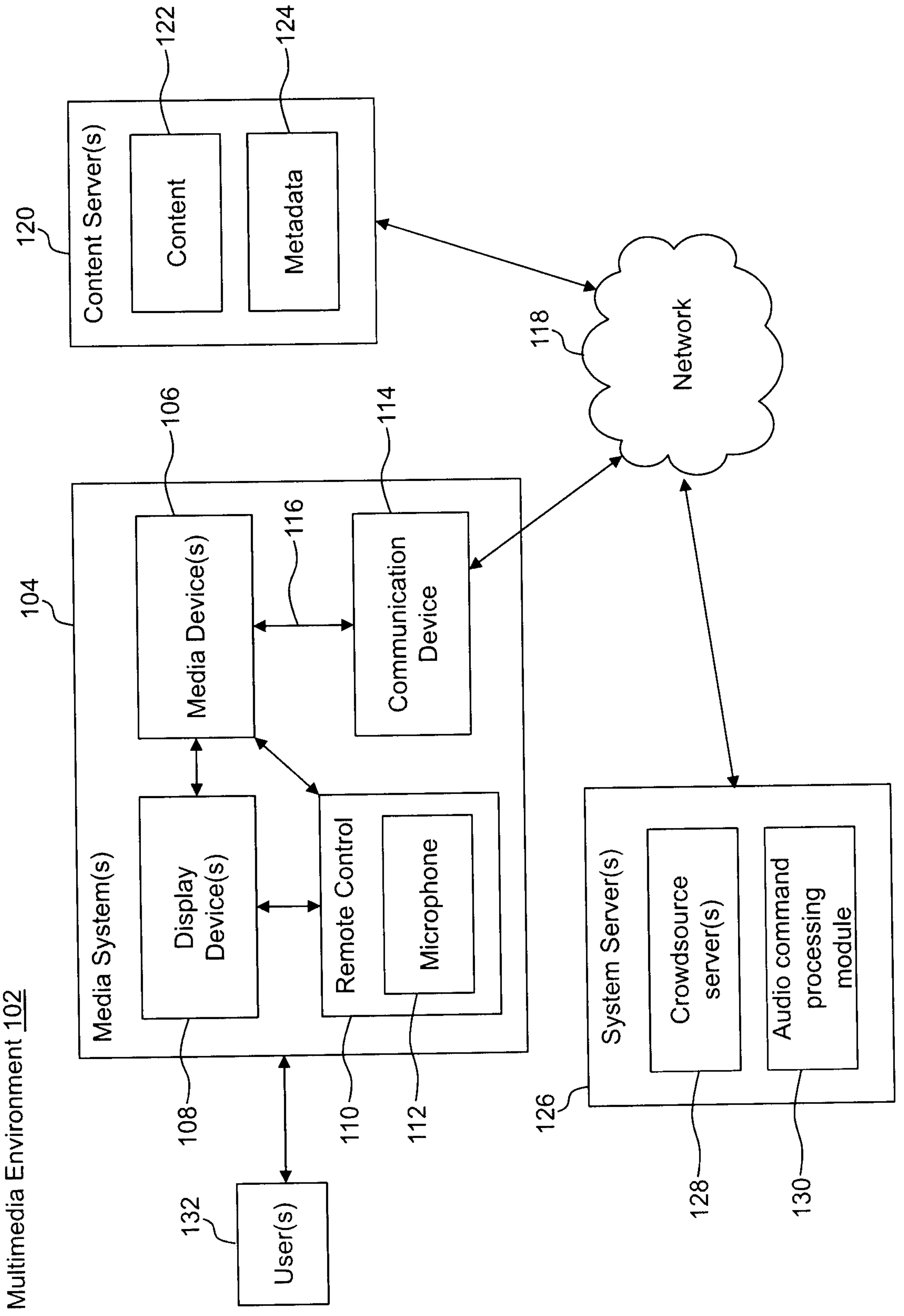
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, inter-net of things (IoT) device, and/or projector, to name just a few examples. In some embodiments, media device 106 can be a part of, integrated with, operatively coupled to, and/or connected to its respective display device 108.

According to some embodiments, display device 108 can include one or more sound sources with slit shaped waveguide as described in this disclosure. As discussed in more detail below, the sound source of this disclosure can include an exit located on the front of display device 108. Therefore, the design of display device 108 (e.g., frameless display device or minimal bezel display device) can be retained without affecting the quality of sound from display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various embodiments, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In an embodiment, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112, The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
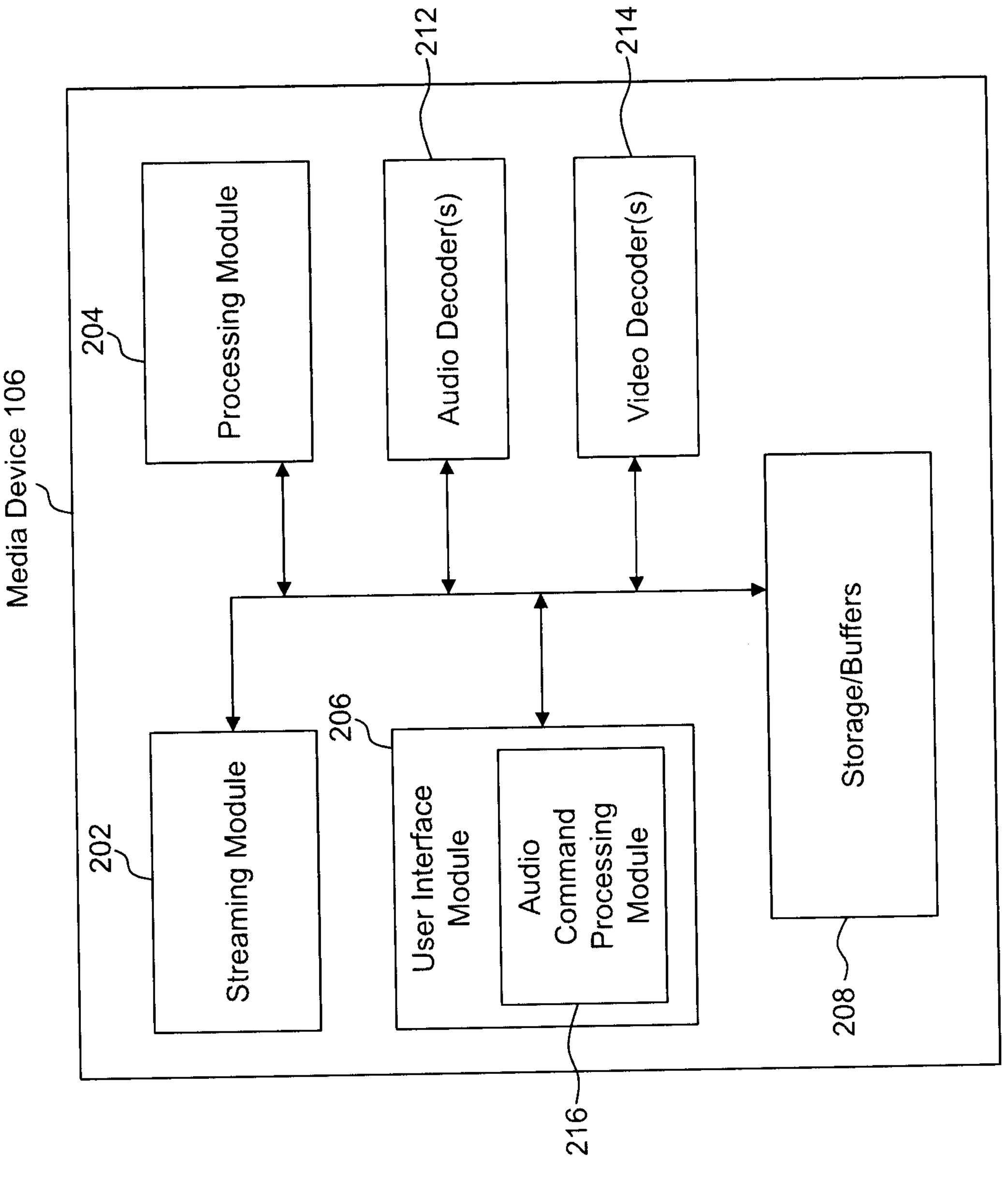
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FIN, AVI, QuickTime, HDV, MXF (OP1a, OP-Atom), MPEG-TS, MPEG-2 PS, MPEG-2 TS, WANT, Broadcast WAV, LXF, GXF, and/or VOB, to name just some examples. Each video decoder 214 may include one or more video codecs, such as but not limited to H.263, H.264, HEV, MPEG1, MPEG-TS, MPEG-4, Theora, 3GP, DV, DVCPRO, DVCPRO, DVCProHD, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120, In non-streaming embodiments, the media device 106 may store the content received from content server(s) 120 in storage/buffers 208 for later playback on display device 108.

Sound Source with Slit Shaped Waveguide

According to some embodiments, display device 108 of FIG. 1 and/or media device 106 of FIGS. 1 and 2 can include one or more sound sources with slit shaped waveguide as described in this disclosure. As discussed in more detail below, the sound source of this disclosure can include an exit located on the front of display device 108 and/or media device 106. Therefore, the design of display device 108 (e.g., frameless display device or minimal bezel display device) and/or media device 106 can be retained without affecting the quality of sound from display device 108 and/or media device 106.

Figure 3:
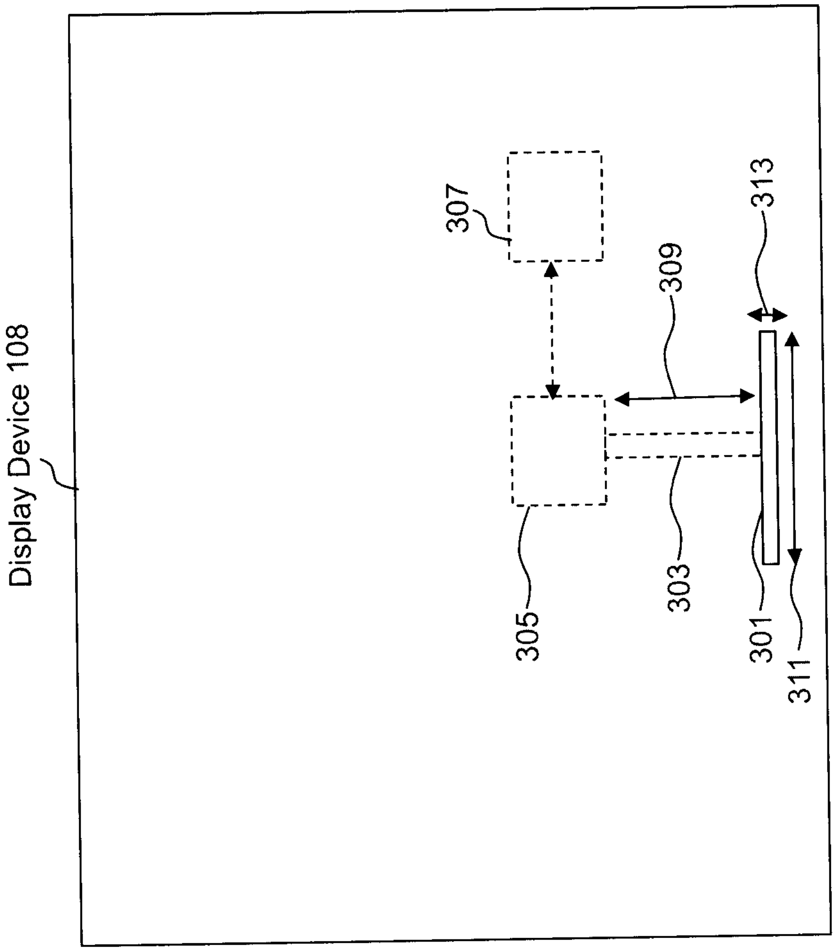
FIG. 3 illustrates a block diagram of a display device including a sound source, according to some embodiments.

FIG. 3 illustrates a block diagram of a display device 108 including a sound source, according to some embodiments.

As discussed above, display device 108 can include a sound source. As discussed above, display device 108 can be a monitor, a TV (e.g., a frameless TV or a minimal bezel TV), a computer, a smart phone, a tablet, a wearable device (such as a watch or glasses), an appliance, an IoT device, and/or a projector, to name just a few examples.

As illustrated in FIG. 3, the sound source of display device 108 can include exit 301, chamber 303, and driver 305. Additionally, display device 108 can include controller 307 configured to control driver 305.

According to some embodiments, the sound source can include a system or a device configured to generate sound waves. For example, the sound source can include, but is not limited to, a speaker, loudspeaker, or any other sound producing system/device.

FIG. 3 illustrates a front view of display device 108. According to some embodiments, chamber 303, driver 305, and controller 307 are located inside display device 108, and are illustrated accordingly in FIG. 3. Exit 301 can located on the front side of display device 108, according to some embodiments. In other words, exit 301 is facing one or more users that are using (e.g., watching content on) display device 108, according to some embodiments.

As discussed above, for keeping display device 108 thin as possible, the speakers (e.g., the loudspeakers) have moved to the back of display device 108 in conventional devices. However, having the speakers on the back of display device 108 compromises the sound clarity of the speakers. In contrast, the sound sources of the embodiments of this disclosure are designed such that exit 301 is located on the front side (e.g., the side facing the users) of display device 108. Therefore, the design of display device 108 (e.g., frameless display device or minimal bezel display device) can be retained without affecting the quality of sound from display device 108.

According to some embodiments, driver 305 can be configured to receive an audio signal current for generating sound waves to be emitted from display device 108. According to some embodiments, controller 307 can be coupled to and control driver 305. For example, controller 307 can be configured to send the audio signal currents to driver 305 for generating sound waves to be emitted from display device 108.

In some examples, driver 305 can include a compression driver. For example, driver 305 can include a compression load driver. As a non-limiting example, driver 305 can include a chamber (not shown) around driver 305. In some examples, the chamber around driver 305 can be frequency dependent. Additionally, driver 305 can include one or more diaphragms (e.g., metal diaphragms) (not shown) configured to vibrate using a coil of wires between poles of a magnet (not shown). In this example, the audio signal current received by driver 305 is fed to the coil of wires between poles of a magnet that makes the one or more diaphragms to vibrate. The vibration of the one or more diaphragms can generate pressurized and vibrating air that ultimately can generate the sound waves based on the audio signal current.

Although some examples of this disclosure are discussed with respect to a compression driver, the embodiments of this disclosure are not limited to these examples and driver 305 can include any driver used for generating sound waves. According to some embodiments, driver 305 is configured to receive the audio signal current and generate the pressurized air. In other words, driver 305 is configured to perform volume displacement/air displacement.

The sound source of display device 108 can further include chamber 303. According to some embodiments, chamber 303 is coupled between driver 305 and exit 301. Chamber 303 is configured to receive the pressurized air from driver 305 and direct the pressurized air toward exit 301.

According to some embodiments, the dimensions of chamber 303 is designed such that chamber 303 is configured to direct the pressurized air from driver 305 to exit 301 without generating or forming sound waves within chamber 303. In other words, chamber 303 is configured to move and direct the pressurized air from driver 305 to exit 301 without generating (or generating minimum amount of) sound waves within chamber 303, according to some embodiments. Therefore, the pressurized air can move from driver 305 to exit 301 like a rigid liquid. The dimensions of chamber 303 can include a length 309 of chamber 303 (e.g., a distance from driver 305 to exit 301) and/or an area of the cross section of chamber 303.

According to some embodiments, the dimension of chamber 303 (e.g., length 309 of chamber 303) is designed to optimize one or more parameters of the sound waves that is emitted from exit 301. The one or more parameters of the sound waves can be associated with the quality of the sound waves. As a non-limiting example, the one or more parameters of the sound waves can include, but are not limited to, accuracy, clarity, volume, fidelity, and/or intelligibility of the sound waves emitted from exit 301. However, the embodiments of this disclosure are not limited to these examples and can include other parameters for the sound waves. According to some embodiments, optimizing a parameter of the sound waves can include meeting one or more conditions associated with the parameter. For example, optimizing the parameter can include determining that the parameter is within a predetermined threshold associated with the parameter.

According to some embodiments, chamber 303 can include a connector used to couple to driver 305 in some examples, the connector can also be designed to optimize one or more parameters of the sound waves that is emitted from exit 301. For example, the shape and/or the dimensions of the connector can be designed to optimize one or more parameters of the sound waves that is emitted from exit 301.

According to some embodiments, chamber 303 is further coupled to exit 301. Exit 301 receives the pressurized air from chamber 303. Exit 301 is then configured to generate sound waves from the received pressurized are and is configured to emit the sound waves from the display device 108.

According to some embodiments, exit 301 is a slit shaped exit configured to generate and emit the sound waves. In some examples, channel 303 and slit shaped exit 301 can be referred to as slit shape waveguide in this disclosure. In a non-liming example, slit shaped exit 301 can have length 311 of about 5 mm to above 20 mm. For example, slit shaped exit 301 can have length 311 of about 7 mm to above 15 mm. For example, slit shaped exit 301 can have length 311 of about 12 mm. In a non-liming example, slit shaped exit 301 can have height 313 of about 0.25 mm to above 5 mm. For example, slit shaped exit 301 can have height 313 of about 0.5 mm to above 2 mm. For example, slit shaped exit 301 can have height 313 of about 1 mm. However, the embodiments of this disclosure are not limited to these examples, and slit shaped exit 301 can include other dimensions.

Also, although one exit 301 is illustrated in FIG. 3, the embodiments of this disclosure can include other number of exits 301 located at different parts of the display device 108. In one example, sound source of display device 108 can include two or more exits 301. For example, sound source of display device 108 can include a first exit located at the right corner of display device 108 facing the user of display device 108 and a second exit located at the left corner display device 108 facing the user of display device 108. Additionally, or alternatively, the first and second exits can be arranged in an array of exits.

In another non-limiting example, two (or more) slit shaped exits can be arranged in a line or in an army located on a front side of display device 108. In another non-limiting example, two (or more) slit shaped exits can be arranged in a line or in an array located on sides of the display device 108 different from the front side and the back side of display device 108. In some examples controller 307 can manipulate the sound for each one of the slit shaped exits (e.g., with some delay compared to each other) or can manipulate the sound to emit to different locations (e.g., beaming the sound to the ceiling to bounce from the ceiling so it feels that the sound is coming from the above).

According to some embodiments, when more than one exit 301 is used, each exit can be connected to its respective driver using its respective chamber. For example, when a second exit is used, a second driver is used and is configured to receive a second audio signal current and generate second pressurized air. Similarly, a second chamber is coupled to the second driver and is configured to direct the second pressurized air from the second driver to the second exit.

Additionally, or alternatively, when more than one exit 301 is used, two or more exits can share the same driver and/or the same channel from the driver to the exit.

Although some examples of this disclosure are discussed with respect to slit shaped exits 301, the embodiments of this disclosure are not limited to these examples and other shapes of exits and other number of exits can be used. For example, the exits can include an array of slit shaped exits. As another example, the exits can include one hole, multiple holes, or an array of holes. Other shapes can also be used as long as the geometry of the exit(s) are designed with the required surface area for generating the sound waves from the pressurized air.

Although the sound source of this disclosure is discussed with respect to display device 108, the embodiments of this disclosure are not limited to these examples. The sound source embodiments of this disclosure can be used with other devices, such as but not limited to, media device 106.

FIGS. 4A-4E illustrate block diagrams of exemplary exits and chambers of a sound source, according to some embodiments.

Figure 4C:
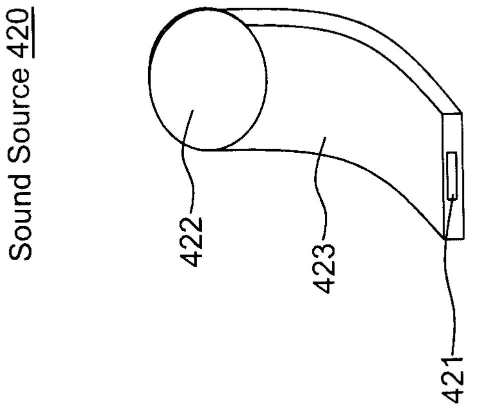
FIGS. 4A-4E illustrate block diagrams of exemplary exits and chambers of a sound source, according to some embodiments.
Figure 4B:
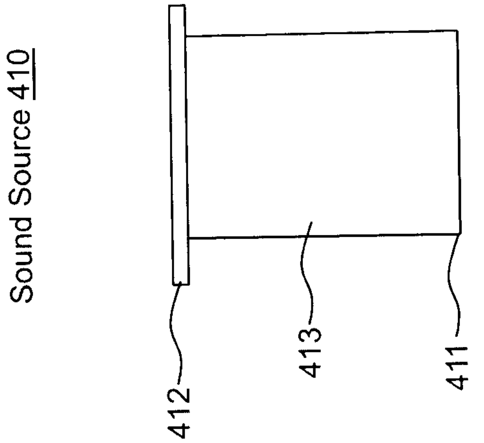
Figure 4A:
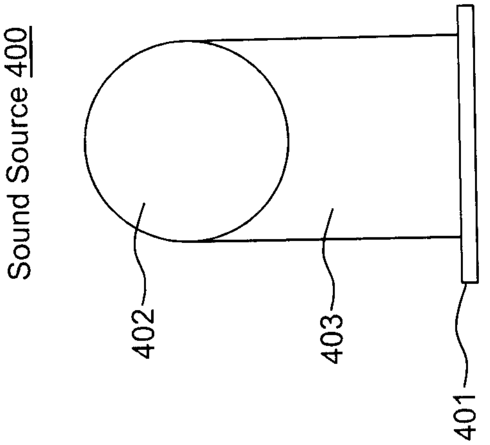

For example, FIG. 4A illustrates a top view of parts of sound source 400 including exit 401, chamber 403, and connector 402. According to some embodiments, exit 401 can include exit 301 of FIG. 3 and chamber 403 can include chamber 303 of FIG. 3. In this example, connector 402 can be used to connect a driver (e.g., driver 305 of FIG. 3) to chamber 403.

FIG. 4B illustrates a top view of parts of another sound source 410 including exit 411, chamber 413, and connector 412. According to some embodiments, exit 411 can include exit 311 of FIG. 3 and chamber 413 can include chamber 303 of FIG. 3. In this example, connector 412 can be used to connect a driver (e.g., driver 305 of FIG. 3) to chamber 413.

Similarly, FIG. 4C illustrates a side view of parts of another sound source 420 including exit 421, chamber 423, and connector 422. According to some embodiments, exit 421 can include exit 311 of FIG. 3 and chamber 423 can include chamber 303 of FIG. 3. In this example, connector 422 can be used to connect a driver (e.g., driver 305 of FIG. 3) to chamber 423, In this example, chamber 423 can be a curved canal connecting exit 421 to the driver.

Figure 4D:
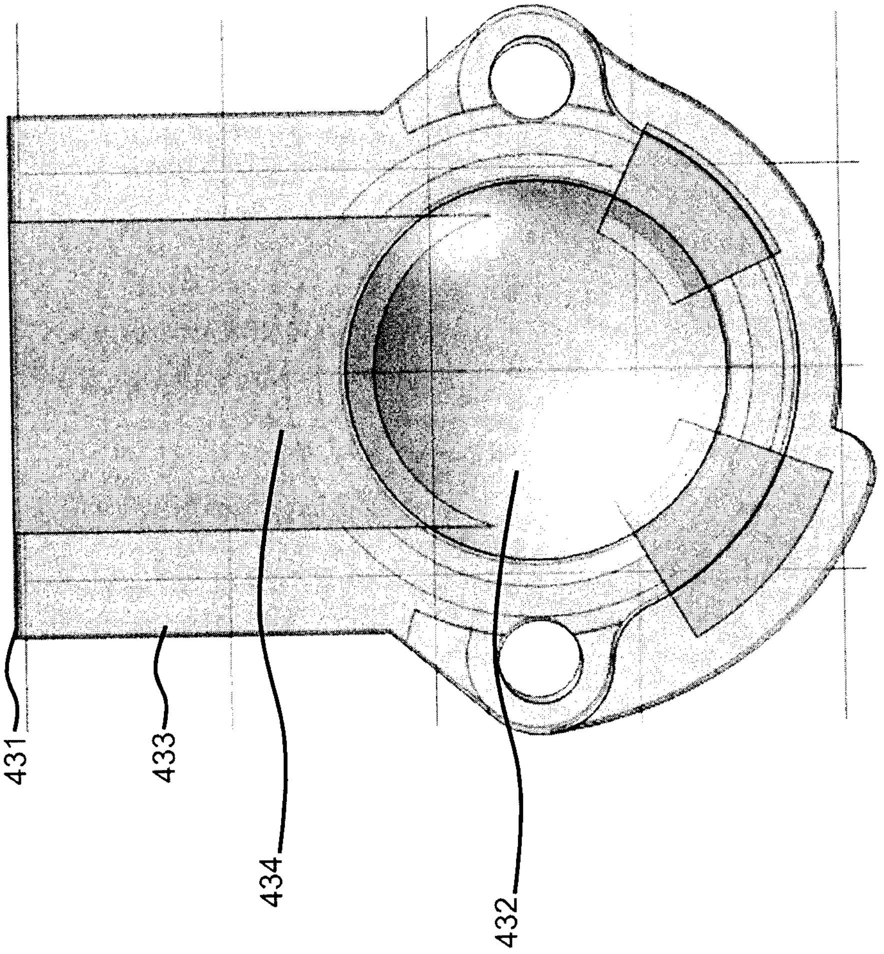

As another example, FIG. 4D illustrates a top view of parts of sound source 430 including exit 431, chamber 433, and connector 432. According to some embodiments, exit 431 can include exit 311 of FIG. 3 and chamber 433 can include chamber 303 of FIG. 3. In this example, connector 432 can be used to connect a driver (e.g., driver 305 of FIG. 3) to chamber 433. According to some embodiments, chamber 433 can include one or more cavities 434. Cavities 434 can be made within chamber 433 to direct the pressurized air from a driver (e.g., driver 305) to an exit (e.g., exit 301). According to some embodiments, the number and/or the dimensions of cavities 434 can designed such that chamber 433 is configured to direct the pressurized air from the driver to the exit without generating or forming sound waves within chamber 433.

Figure 4E:
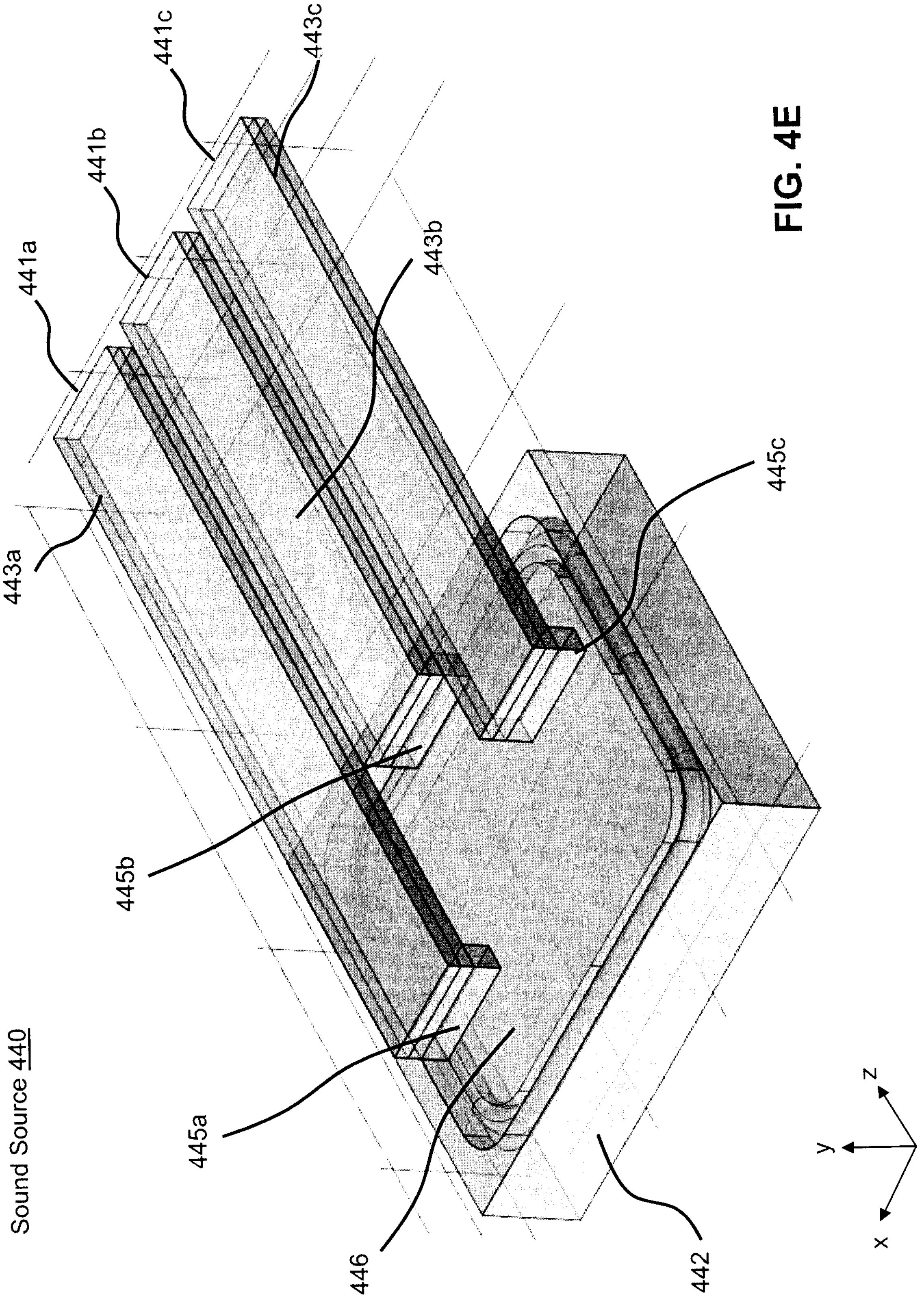

As another example, FIG. 4E illustrates a top view of parts of sound source 440 including exits 441*a*-441*c*, chambers 443*a*-443*c* and connector 442. According to some embodiments, exits 441*a*-441*c* can include exit 311 of FIG. 3 and chambers 443*a*-443*c* can include chamber 303 of FIG. 3. In this example, connector 442 can be used to connect one or more drivers (e.g., driver 305 of FIG. 3) to chambers 443*a*-443*c*. In one exemplary embodiment, each one of chambers 443*a*-443*c* can be coupled to its respective driver. In another example, two or more of chambers 443*a*-443*c* can be coupled to one driver. According to some embodiments, chambers 443*a*-443*c* can be coupled to connector 442 using connections 445*a*-445*c*, respectively. In some embodiments, chambers 443*a*-443*c* can include one or more cavities. The cavities can be made within chambers 443*a*-443*c* to direct the pressurized air from a driver (e.g., driver 305) to an exit (e.g., exit 301). According to some embodiments, the number and/or the dimensions of the cavities can designed such that chambers 443*a*-443*c* are configured to direct the pressurized air from the driver to the exit without generating or forming sound waves within chambers 443*a*-443*c*. According to some embodiments, connector 442 can include one or more cavities 446. Cavities 446 can be used to house and/or to be couple to the driver and also to couple to chambers 443*a*-443*c* using connections 445*a*-445*c*.

As discussed above, according to some embodiments, exits 401, 411, 421, 431, and 441*a*-441*c* are located on the front of a display device and/or a media device the number, the shape, and the dimensions of exits 401, 411, 421, 431, and 441*a*-441*c* can be designed such that these exits can generate sound waves from pressurized air from the driver of sound sources 400, 410, 420, 430, and 440. According to some embodiments, the number, the shape, and the dimensions of exits 401, 411, 421, 431, and 441*a*-441*c* can be designed to optimize one or more parameters of the sound waves that is emitted from these exits. The one or more parameters of the sound waves can be associated with the quality of the sound waves. As a non-limiting example, the one or more parameters of the sound waves can include, but are not limited to, accuracy, clarity, volume, fidelity, and/or intelligibility of the sound waves emitted from these exits.

Similarly, the number, the shape, and the dimensions of chambers 403, 413, 423, 433, and 443*a*-443*c* and/or connectors 402, 412, 422, 432, and 442 can be designed to optimize one or more parameters of the sound waves that is emitted from sound sources 400, 410, 420, 430, and 440. The one or more parameters of the sound waves can be associated with the quality of the sound waves. As a non-limiting example, the one or more parameters of the sound waves can include, but are not limited to, accuracy, clarity, volume, fidelity, and/or intelligibility of the sound waves emitted from sound sources 400, 410, 420, 430, and 440.

Figure 5:
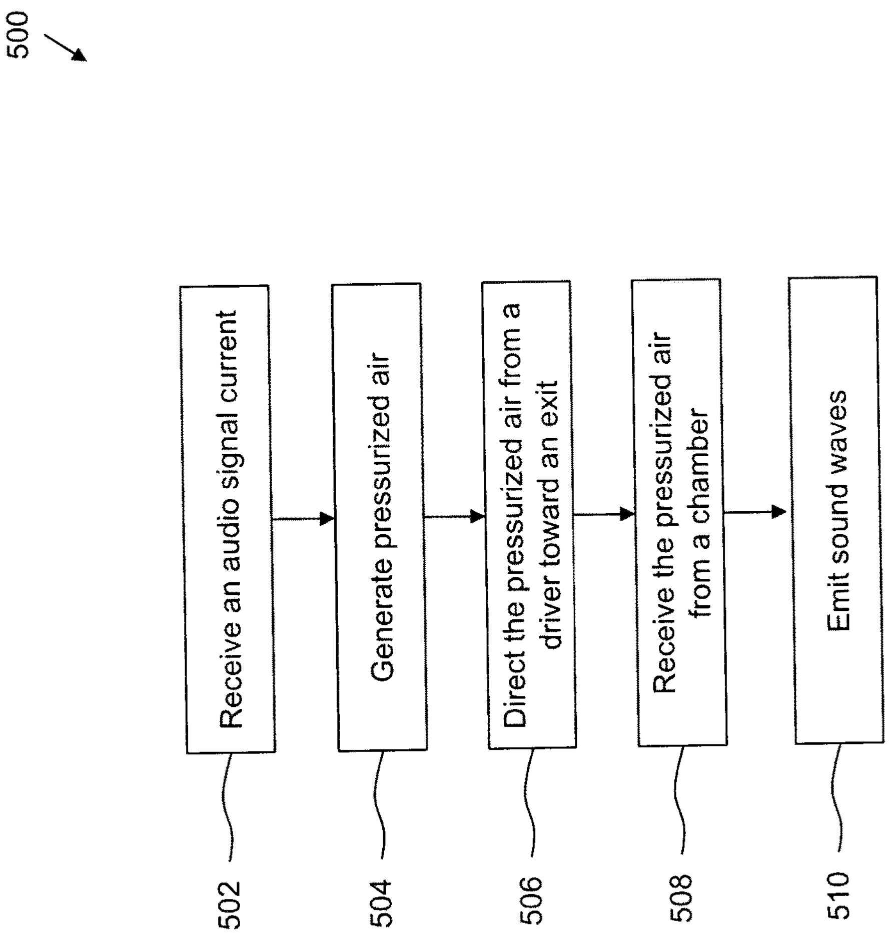
FIG. 5 illustrates an example method for generating and emitting sound waves using a sound source with an exit on the front side of a display device, according to some embodiments.

FIG. 5 illustrates an example method 500 for generating and emitting sound waves using a sound source with an exit on the front side of a display device, according to some embodiments. As a convenience and not a limitation, FIG. 5 may be described with regard to elements of FIGS. 1-4. Method 500 may represent the operation of a sound source (e.g., sound source of FIG. 3 and/or sound sources 400, 410, 420, 430, and 440 of FIGS. 4A-4E) for generating and emitting sound waves using an exit on the front side of a display device and/or a media device. But method 500 is not limited to the specific aspects depicted in those figures and other systems may be used to perform the method as will be understood by those skilled in the art. It is to be appreciated that not all operations may be needed, and the operations may not be performed in the same order as shown in FIG. 5.

At 502, a driver of a sound source receives an audio signal current. For example, driver 305 of FIG. 3 can receive an audio signal current that can be used to generate sound waves. In some embodiments, the driver of the sound source can receive the audio signal current from a controller (e.g., controller 307 of FIG. 3.)

At 504, the driver generates pressurized air. For example, based on the audio signal current, the driver generates the pressurized air. In a non-limiting example, the driver can be a compression driver including one or more diaphragms to vibrate using a coil of wires between poles of a magnet. In this example, the audio signal current received by the driver can be fed to the coil of wires between poles of a magnet that makes the one or more diaphragms to vibrate. The vibration of the one or more diaphragms can generate the pressurized and vibrating air that ultimately can generate the sound waves based on the audio signal current.

At 506, a chamber of the sound source can direct the pressurized air from the driver to an exit of the sound source. In some embodiments, the chamber is coupled to the driver and the exit. For example, chamber 303 of FIG. 3, which is coupled to driver 305, directs the pressurized air generated by driver 305 to exit 301.

At 508, the exit receives the pressurized air. The exit (e.g., exit 301 of FIG. 3) is coupled to the chamber (e.g., chamber 303) and receives the pressurized air from the driver (e.g., driver 305.)

At 510, the exit emits sound waves. For example, the exit (e.g., exit 301 of FIG. 3) generates and emits the sound waves based on the pressurized air that the exit receives. The pressurized air and therefore, the sound waves are based on the audio signal current.

Example Computer System

Figure 6:
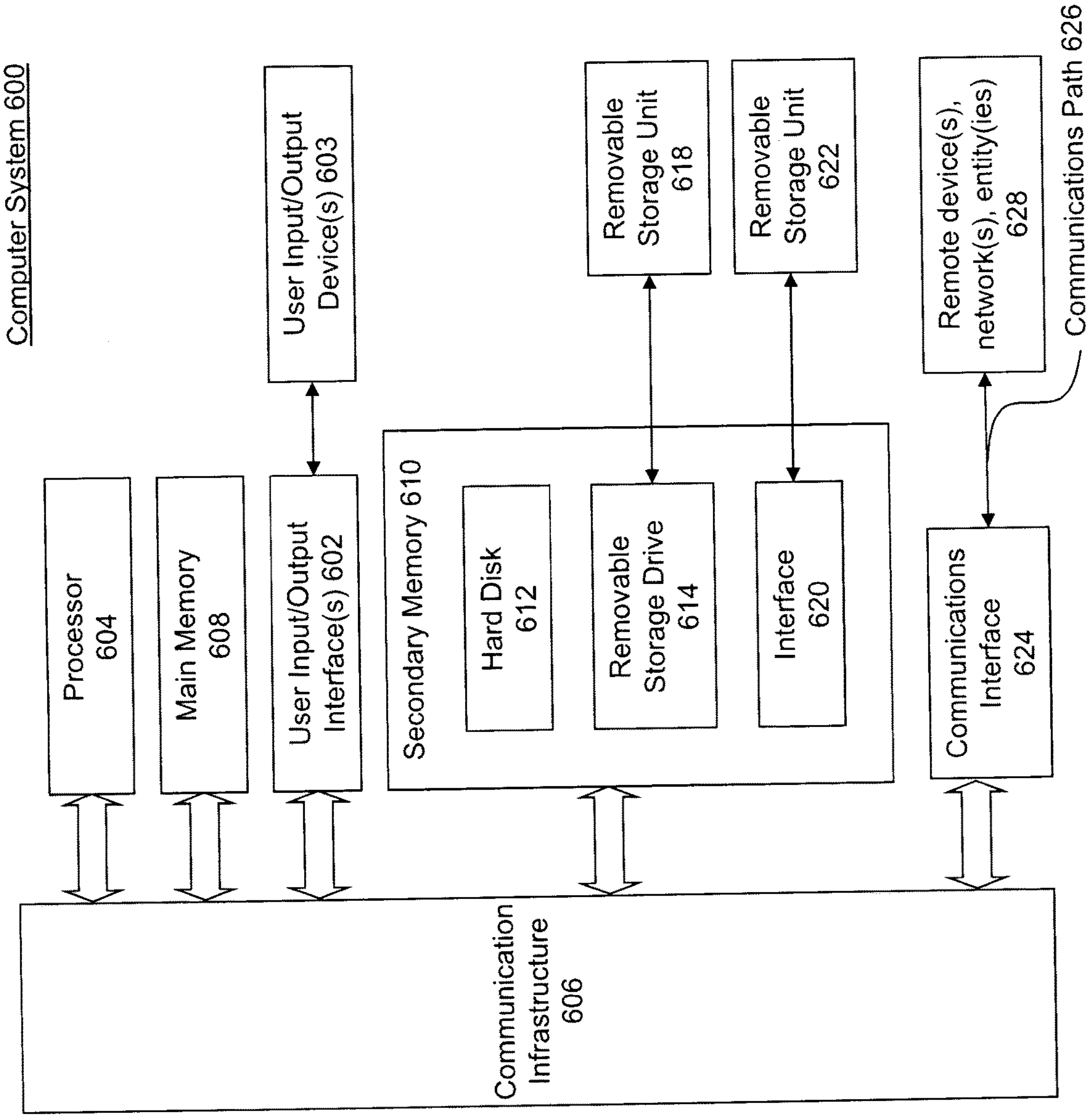
FIG. 6 illustrates an example computer system useful for implementing various embodiments.

Various embodiments may be implemented, for example, using one or more well-known computer systems, such as computer system 600 shown in FIG. 6. For example, media device 106 and/or display device 108 may be implemented using combinations or sub-combinations of computer system 600. Also or alternatively, one or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data, Removable storage unit 618 may be a floppy disk, magnetic tape, compact disk, DVD, optical storage disk, and/or any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600, Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624, Communication interface 624 may enable computer system 600 to communicate and interact with any combination of external devices, external networks, external entities, etc. (individually and collectively referenced by reference number 628), For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

Conclusion

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A sound source, comprising:

a compression driver configured to receive an audio signal current and to generate pressurized air;

a plurality of chambers coupled to the compression driver and configured to direct the pressurized air from the compression driver; and a plurality of slit shaped exits coupled to the plurality of chambers and configured to receive the pressurized air from the plurality of chambers and to generate and emit sound waves based on the pressurized air, wherein a first set of two or more slit shaped exits of the plurality of slit shaped exits is coupled to a first chamber of the plurality of chambers and a second set of two or more slit shaped exits of the plurality of slit shaped exits is coupled to a second chamber of the plurality of chambers, wherein the sound source is associated with a display device and the plurality of slit shaped exits are located on a front side of the display device, and wherein the plurality of chambers comprise a connector to couple to the compression driver.

2. The sound source of claim 1, wherein a shape or a dimension of the connector is designed such that a parameter of the sound waves is within a predetermined threshold.

3. The sound source of claim 1, wherein the plurality of slit shaped exits are arranged in an array.

4. The sound source of claim 1, wherein each of the plurality of slit shaped exits has a length of about 12 mm and a height of about 1 mm.

5. The sound source of claim 1, further comprising:

a second driver configured to receive a second audio signal current and to generate second pressurized air; and a third chamber coupled to the second driver and configured to direct the second pressurized air from the second driver.

6. The sound source of claim 5, further comprising:

a second slit shaped exit coupled to the third chamber and configured to receive the second pressurized air from the third chamber and to emit second sound waves.

7. The sound source of claim 5, further comprising:

an array of exits coupled to the third chamber and configured to receive the second pressurized air from the third chamber and to emit second sound waves, wherein a surface area of the array of exits is designed to emit the second sound waves.

8. The sound source of claim 1, wherein a length of each of the plurality of chambers is designed to optimize one or more parameters of the sound waves.

9. A display device, comprising:

a sound source, comprising:

a compression driver configured to receive an audio signal current and to generate pressurized air;

a plurality of chambers coupled to the compression driver and configured to direct the pressurized air from the compression driver; and a plurality of slit shaped exits located on a front side of the display device and coupled to the plurality of chambers and configured to receive the pressurized air from the plurality of chambers and to generate and emit sound waves based on the pressurized air, wherein a first set of two or more slit shaped exits of the plurality of slit shaped exits is coupled to a first chamber of the plurality of chambers and a second set of two or more slit shaped exits of the plurality of slit shaped exits is coupled to a second chamber of the plurality of chambers, and wherein the plurality of chambers comprise a connector to couple to the compression driver.

10. The display device of claim 9, wherein a shape or a dimension of the connector is designed such that a parameter of the sound waves is within a predetermined threshold.

11. The display device of claim 9, wherein the plurality of slit shaped exits are arranged in an array.

12. The display device of claim 9, wherein each of the plurality of slit shaped exits has a length of about 12 mm and a height of about 1 mm.

13. The display device of claim 9, wherein the sound source further comprises:

a second driver configured to receive a second audio signal current and to generate second pressurized air; and a third chamber coupled to the second driver and configured to direct the second pressurized air from the second driver.

14. The display device of claim 13, wherein the sound source further comprises:

an array of exits coupled to the third chamber and configured to receive the second pressurized air from the third chamber and to emit second sound waves, wherein a surface area of the array of exits is designed to emit the second sound waves.

15. The display device of claim 9, wherein a length of each of the plurality of chambers is designed to optimize one or more parameters of the sound waves.

16. A method, comprising:

receiving, by a compression driver of a sound source of a display device, an audio signal current;

generating, by the compression driver, pressurized air;

directing, using a plurality of chambers coupled to the compression driver, the pressurized air from the compression driver;

receiving, using a plurality of slit shaped exits coupled to the plurality of chambers, the pressurized air from the plurality of chambers, wherein the plurality of slit shaped exits are located on a front side of the display device and wherein a first set of two or more slit shaped exits of the plurality of slit shaped exits is coupled to a first chamber of the plurality of chambers and a second set of two or more slit shaped exits of the plurality of slit shaped exits is coupled to a second chamber of the plurality of chambers;

generating, using the plurality of slit shaped exits and using the pressurized air, sound waves; and emitting, using the plurality of slit shaped exits, the sound waves, wherein the plurality of chambers comprises a connector to couple to the compression driver.

* * * * *